(12) United States Patent
Leijon et al.

(10) Patent No.: US 6,906,447 B2
(45) Date of Patent: *Jun. 14, 2005

(54) ROTATING ASYNCHRONOUS CONVERTER AND A GENERATOR DEVICE

(75) Inventors: Mats Leijon, Västerås (SE); Thorsten Schütte, Västerås (SE); Christian Sasse, Västerås (SE); Udo Fromm, Västerås (SE)

(73) Assignee: ABB AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 251 days.

This patent is subject to a terminal disclaimer.

(21) Appl. No.: 08/973,306
(22) PCT Filed: May 27, 1997
(86) PCT No.: PCT/SE97/00890
§ 371 (c)(1),
(2), (4) Date: Apr. 10, 1998
(87) PCT Pub. No.: WO97/45912
PCT Pub. Date: Dec. 4, 1997

(65) Prior Publication Data
US 2001/0055217 A1 Dec. 27, 2001

(30) Foreign Application Priority Data
May 29, 1996 (SE) ................................ 9602079

(51) Int. Cl.[7] .......................... H02K 3/40; H02K 47/18
(52) U.S. Cl. .............. 310/196; 310/184; 174/DIG. 17; 174/DIG. 19; 174/DIG. 29; 363/174; 290/5; 290/6; 290/52

(58) Field of Search .............................. 363/8, 102–105, 363/174–176, 159, 165, 164; 290/5, 6, 8, 52, 1 R; 310/179, 180, 184, 195–196, 198–208, 213; 174/DIG. 13–33; 307/68; 148/269

(56) References Cited

U.S. PATENT DOCUMENTS

| 681,800 A | 9/1901 | Lasche |
| 847,008 A | 3/1907 | Kitsee |

(Continued)

FOREIGN PATENT DOCUMENTS

| AT | 399790 | 7/1995 |
| BE | 565063 | 2/1957 |
| CH | 391071 | 4/1965 |

(Continued)

OTHER PUBLICATIONS

Shipboard Electrical Insulation; G. L. Moses, 1951, pp2&3.
ABB Elkrafthandbok: ABB AB; 1988 ; pp274–276.
Eikrait teknisk Handbok, 2 Elmaskiner; A. Alfredsson et al; 1988, pp. 121–123.

(Continued)

*Primary Examiner*—Burton Mullins
(74) *Attorney, Agent, or Firm*—Dykema Gossett PLLC

(57) ABSTRACT

A rotating asynchronous converter for connection of AC network with equal or different frequencies employs a first stator connected to a first AC network with a first frequency and a second stator connected to a second AC network with a second frequency, and a rotor which rotates in response to the first and second frequencies. The converter has at least one winding formed of a cable, including a conductor and a magnetically permeable, electric field confining insulating covering surrounding the conductor.

46 Claims, 3 Drawing Sheets

U.S. PATENT DOCUMENTS

| | | |
|---|---|---|
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,891,716 A * | 12/1932 | Laffoon ............... 310/196 |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camili |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck ............... 310/64 |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |

| | | | | | | |
|---|---|---|---|---|---|---|
| 4,208,597 A | 6/1980 | Mulach et al. | | 4,588,916 A | 5/1986 | Lis |
| 4,229,721 A | 10/1980 | Koloczek et al. | | 4,590,416 A | 5/1986 | Porche et al. |
| 4,238,339 A | 12/1980 | Khutoretsky et al. | | 4,594,630 A | 6/1986 | Rabinowitz et al. |
| 4,239,999 A | 12/1980 | Vinokurov et al. | | 4,607,183 A | 8/1986 | Rieber et al. |
| 4,245,182 A | 1/1981 | Aotsu et al. | | 4,615,109 A | 10/1986 | Wcislo et al. |
| 4,246,694 A | 1/1981 | Raschbichler et al. | | 4,615,778 A | 10/1986 | Elton |
| 4,255,684 A | 3/1981 | Mischler et al. | | 4,618,795 A | 10/1986 | Cooper et al. |
| 4,258,280 A | 3/1981 | Starcevic | | 4,619,040 A | 10/1986 | Wang et al. |
| 4,262,209 A | 4/1981 | Berner | | 4,622,116 A | 11/1986 | Elton et al. |
| 4,274,027 A | 6/1981 | Higuchi et al. | | 4,633,109 A | 12/1986 | Feigel |
| 4,281,264 A | 7/1981 | Keim et al. | | 4,650,924 A | 3/1987 | Kauffman et al. |
| 4,292,558 A | 9/1981 | Flick et al. | | 4,652,963 A | 3/1987 | Fahlen |
| 4,307,311 A | 12/1981 | Grozinger | | 4,656,316 A | 4/1987 | Meltsch |
| 4,308,476 A | 12/1981 | Schuler | | 4,656,379 A | 4/1987 | McCarty |
| 4,308,575 A | 12/1981 | Mase | | 4,677,328 A | 6/1987 | Kumakura |
| 4,310,966 A | 1/1982 | Brietenbach | | 4,687,882 A | 8/1987 | Stone et al. |
| 4,314,168 A | 2/1982 | Breitenbach | | 4,692,731 A | 9/1987 | Osinga |
| 4,317,001 A | 2/1982 | Silver et al. | | 4,723,083 A | 2/1988 | Elton |
| 4,320,645 A | 3/1982 | Stanley | | 4,723,104 A | 2/1988 | Rohatyn |
| 4,321,426 A | 3/1982 | Schaeffer | | 4,724,345 A | 2/1988 | Elton et al. |
| 4,321,518 A | 3/1982 | Akamatsu | | 4,732,412 A | 3/1988 | van der Linden et al. |
| 4,330,726 A | 5/1982 | Albright et al. | | 4,737,704 A | 4/1988 | Kalinnikov et al. |
| 4,337,922 A | 7/1982 | Streiff et al. | | 4,745,314 A | 5/1988 | Nakano |
| 4,341,989 A | 7/1982 | Sandberg et al. | | 4,761,602 A | 8/1988 | Leibovich |
| 4,347,449 A | 8/1982 | Beau | | 4,766,365 A | 8/1988 | Bolduc et al. |
| 4,347,454 A | 8/1982 | Gellert et al. | | 4,771,168 A | 9/1988 | Gundersen et al. |
| 4,357,542 A | 11/1982 | Kirschbaum | | 4,785,138 A | 11/1988 | Brietenbach et al. |
| 4,360,748 A | 11/1982 | Raschbichler et al. | | 4,795,933 A | 1/1989 | Sakai |
| 4,361,723 A | 11/1982 | Hvizd, Jr. et al. | | 4,827,172 A | 5/1989 | Kobayashi |
| 4,363,612 A | 12/1982 | Walchhutter | | 4,845,308 A | 7/1989 | Womack, Jr. et al. |
| 4,365,178 A | 12/1982 | Lexz | | 4,847,747 A | 7/1989 | Abbondanti |
| 4,367,425 A | 1/1983 | Mendelsohn et al. | | 4,853,565 A * | 8/1989 | Elton et al. .................. 310/45 |
| 4,367,890 A | 1/1983 | Spirk | | 4,859,810 A | 8/1989 | Cloetens et al. |
| 4,368,418 A | 1/1983 | Demello et al. | | 4,859,989 A | 8/1989 | McPherson |
| 4,369,389 A | 1/1983 | Lambrecht | | 4,860,430 A | 8/1989 | Raschbichler et al. |
| 4,371,745 A | 2/1983 | Sakashita | | 4,864,266 A | 9/1989 | Feather et al. |
| 4,384,944 A | 5/1983 | Silver et al. | | 4,883,230 A | 11/1989 | Lindstrom |
| 4,387,316 A | 6/1983 | Katsekas | | 4,890,040 A | 12/1989 | Gundersen |
| 4,401,920 A | 8/1983 | Taylor et al. | | 4,894,284 A | 1/1990 | Yamanouchi et al. |
| 4,403,163 A | 9/1983 | Rarmerding et al. | | 4,914,386 A | 4/1990 | Zocholl |
| 4,404,486 A | 9/1983 | Keim et al. | | 4,918,347 A | 4/1990 | Takaba |
| 4,411,710 A | 10/1983 | Mochizuki et al. | | 4,918,835 A | 4/1990 | Waslo et al. |
| 4,421,284 A | 12/1983 | Pan | | 4,924,342 A | 5/1990 | Lee |
| 4,425,521 A | 1/1984 | Rosenberry, Jr. et al. | | 4,926,079 A | 5/1990 | Niemela et al. |
| 4,426,771 A | 1/1984 | Wang et al. | | 4,942,326 A | 7/1990 | Butler, III et al. |
| 4,429,244 A | 1/1984 | Nikiten et al. | | 4,949,001 A | 8/1990 | Campbell |
| 4,431,960 A | 2/1984 | Zucker | | 4,982,147 A | 1/1991 | Lauw |
| 4,432,029 A | 2/1984 | Lundqvist | | 4,994,952 A | 2/1991 | Silva et al. |
| 4,437,464 A | 3/1984 | Crow | | 4,997,995 A | 3/1991 | Simmons et al. |
| 4,443,725 A | 4/1984 | Derderian et al. | | 5,012,125 A | 4/1991 | Conway |
| 4,470,884 A | 9/1984 | Carr | | 5,030,813 A | 7/1991 | Stanisz |
| 4,473,765 A | 9/1984 | Butman, Jr. et al. | | 5,036,165 A | 7/1991 | Elton et al. |
| 4,475,075 A | 10/1984 | Munn | | 5,036,238 A | 7/1991 | Tajima |
| 4,477,690 A | 10/1984 | Nikitin et al. | | 5,066,881 A | 11/1991 | Elton et al. |
| 4,481,438 A | 11/1984 | Keim | | 5,067,046 A | 11/1991 | Elton et al. |
| 4,484,106 A | 11/1984 | Taylor et al. | | 5,083,360 A | 1/1992 | Valencic et al. |
| 4,488,079 A | 12/1984 | Dailey et al. | | 5,086,246 A | 2/1992 | Dymond et al. |
| 4,490,651 A | 12/1984 | Taylor et al. | | 5,091,609 A | 2/1992 | Swada et al. |
| 4,503,284 A | 3/1985 | Minnick et al. | | 5,094,703 A * | 3/1992 | Takaoka et al. ............ 148/269 |
| 4,508,251 A | 4/1985 | Harada et al. | | 5,095,175 A | 3/1992 | Yoshida et al. |
| 4,510,077 A | 4/1985 | Elton | | 5,097,241 A | 3/1992 | Smith et al. |
| 4,517,471 A | 5/1985 | Sachs | | 5,097,591 A | 3/1992 | Wcislo et al. |
| 4,520,287 A | 5/1985 | Wang et al. | | 5,111,095 A | 5/1992 | Hendershot |
| 4,523,249 A | 6/1985 | Arimoto | | 5,124,607 A | 6/1992 | Rieber et al. |
| 4,538,131 A | 8/1985 | Baier et al. | | 5,136,459 A | 8/1992 | Fararooy |
| 4,546,210 A | 10/1985 | Akiba et al. | | 5,140,290 A | 8/1992 | Dersch |
| 4,551,780 A | 11/1985 | Canay | | 5,153,460 A | 10/1992 | Bovino et al. |
| 4,557,038 A | 12/1985 | Wcislo et al. | | 5,168,662 A | 12/1992 | Nakamura et al. |
| 4,560,896 A | 12/1985 | Vogt et al. | | 5,171,941 A | 12/1992 | Shimizu et al. |
| 4,565,929 A | 1/1986 | Baskin et al. | | 5,182,537 A | 1/1993 | Thuis |
| 4,571,453 A | 2/1986 | Takaoka et al. | | 5,187,428 A | 2/1993 | Hutchison et al. |

| | | | | | |
|---|---|---|---|---|---|
| 5,231,249 A | 7/1993 | Kimura et al. | DE | 584639 | 9/1933 |
| 5,235,488 A | 8/1993 | Koch | DE | 586121 | 10/1933 |
| 5,246,783 A | 9/1993 | Spenadel et al. | DE | 604972 | 11/1934 |
| 5,264,778 A | 11/1993 | Kimmel et al. | DE | 629301 | 4/1936 |
| 5,287,262 A | 2/1994 | Klein | DE | 673545 | 3/1939 |
| 5,304,883 A | 4/1994 | Denk | DE | 719009 | 3/1942 |
| 5,305,961 A | 4/1994 | Errard et al. | DE | 846583 | 8/1952 |
| 5,321,308 A | 6/1994 | Johncock | DE | 875227 | 4/1953 |
| 5,323,330 A | 6/1994 | Asplund et al. | DE | 975999 | 1/1963 |
| 5,325,008 A | 6/1994 | Grant | DE | 1465719 | 5/1969 |
| 5,325,259 A | 6/1994 | Paulsson | DE | 1807391 | 5/1970 |
| 5,327,637 A | 7/1994 | Britenbach et al. | DE | 2050674 | 5/1971 |
| 5,341,281 A | 8/1994 | Skibinski | DE | 1638176 | 6/1971 |
| 5,343,139 A | 8/1994 | Gyugyi et al. | DE | 2155371 | 5/1973 |
| 5,355,046 A | 10/1994 | Weigelt | DE | 2400698 | 7/1975 |
| 5,365,132 A | 11/1994 | Hann et al. | DE | 2520511 | 11/1976 |
| 5,387,890 A | 2/1995 | Estop et al. | DE | 2656389 | 6/1978 |
| 5,397,513 A | 3/1995 | Steketee, Jr. | DE | 2721905 | 11/1978 |
| 5,399,941 A | 3/1995 | Grothaus et al. | DE | 137164 | 8/1979 |
| 5,400,005 A | 3/1995 | Bobry | DE | 138840 | 11/1979 |
| 5,408,169 A * | 4/1995 | Jeanneret ................... 318/808 | DE | 2824951 | 12/1979 |
| 5,449,861 A | 9/1995 | Fujino et al. | DE | 2835386 | 2/1980 |
| 5,452,170 A | 9/1995 | Ohde et al. | DE | 2839517 | 3/1980 |
| 5,468,916 A | 11/1995 | Litenas et al. | DE | 2854520 | 6/1980 |
| 5,499,178 A | 3/1996 | Mohan | DE | 3009102 | 9/1980 |
| 5,500,632 A | 3/1996 | Halser, III | DE | 2913697 | 10/1980 |
| 5,510,942 A | 4/1996 | Bock et al. | DE | 2920478 | 12/1980 |
| 5,530,307 A | 6/1996 | Horst | DE | 3028777 | 3/1981 |
| 5,533,658 A | 7/1996 | Benedict et al. | DE | 2939004 | 4/1981 |
| 5,534,754 A | 7/1996 | Poumey | DE | 3006382 | 8/1981 |
| 5,545,853 A | 8/1996 | Hildreth | DE | 3008818 | 9/1981 |
| 5,550,410 A | 8/1996 | Titus | DE | 209313 | 4/1984 |
| 5,583,387 A | 12/1996 | Takeuchi et al. | DE | 3305225 | 8/1984 |
| 5,587,126 A | 12/1996 | Steketee, Jr. | DE | 3309051 | 9/1984 |
| 5,598,137 A | 1/1997 | Alber et al. | DE | 3441311 | 5/1986 |
| 5,607,320 A | 3/1997 | Wright | DE | 3543106 | 6/1987 |
| 5,612,510 A | 3/1997 | Hildreth | DE | 2917717 | 8/1987 |
| 5,663,605 A | 9/1997 | Evans et al. | DE | 3612112 | 10/1987 |
| 5,672,926 A | 9/1997 | Brandes et al. | DE | 3726346 | 2/1989 |
| 5,689,223 A | 11/1997 | Demarmels et al. | DE | 3925337 | 2/1991 |
| 5,807,447 A | 9/1998 | Forrest | DE | 4023903 | 11/1991 |
| 5,834,699 A | 11/1998 | Buck et al. | DE | 4022476 | 1/1992 |
| | | | DE | 4233558 | 3/1994 |
| | FOREIGN PATENT DOCUMENTS | | DE | 4402184 | 8/1995 |
| CH | SU 266037 | 10/1965 | DE | 4409794 | 8/1995 |
| CH | 534448 | 2/1973 | DE | 4412761 | 10/1995 |
| CH | 539328 | 7/1973 | DE | 4420322 | 12/1995 |
| CH | SU 646403 | 2/1979 | DE | 19620906 | 1/1996 |
| CH | 657482 | 8/1986 | DE | 4438186 | 5/1996 |
| CH | SU 1189322 | 10/1986 | DE | 19020222 | 3/1997 |
| DE | 40414 | 8/1887 | DE | 19547229 | 6/1997 |
| DE | 277012 | 7/1914 | DE | 468827 | 7/1997 |
| DE | 336418 | 6/1920 | DE | 134022 | 12/2001 |
| DE | 372390 | 3/1923 | EP | 049104 | 4/1982 |
| DE | 386561 | 12/1923 | EP | 0493704 | 4/1982 |
| DE | 387973 | 1/1924 | EP | 0056580 A1 | 7/1982 |
| DE | 406371 | 11/1924 | EP | 078908 | 5/1983 |
| DE | 425551 | 2/1926 | EP | 0120154 | 10/1984 |
| DE | 426793 | 3/1926 | EP | 0130124 | 1/1985 |
| DE | 432169 | 7/1926 | EP | 0142813 | 5/1985 |
| DE | 433749 | 9/1926 | EP | 0155405 | 9/1985 |
| DE | 435608 | 10/1926 | EP | 0102513 | 1/1986 |
| DE | 435609 | 10/1926 | EP | 0174783 | 3/1986 |
| DE | 441717 | 3/1927 | EP | 0185788 | 7/1986 |
| DE | 443011 | 4/1927 | EP | 0277358 | 8/1986 |
| DE | 460124 | 5/1928 | EP | 0234521 | 9/1987 |
| DE | 482506 | 9/1929 | EP | 0244069 | 11/1987 |
| DE | 501181 | 7/1930 | EP | 0246377 | 11/1987 |
| DE | 523047 | 4/1931 | EP | 0265868 | 5/1988 |
| DE | 568508 | 1/1933 | EP | 0274691 | 7/1988 |
| DE | 572030 | 3/1933 | EP | 0280759 | 9/1988 |

| | | | | | |
|---|---|---|---|---|---|
| EP | 0282876 | 9/1988 | GB | 870583 | 6/1961 |
| EP | 0309096 | 3/1989 | GB | 965741 | 8/1964 |
| EP | 0314860 | 5/1989 | GB | 992249 | 5/1965 |
| EP | 0316911 | 5/1989 | GB | 1024583 | 3/1966 |
| EP | 0317248 | 5/1989 | GB | 1053337 | 12/1966 |
| EP | 0335430 | 10/1989 | GB | 1059123 | 2/1967 |
| EP | 0342554 | 11/1989 | GB | 1103098 | 2/1968 |
| EP | 0221404 | 5/1990 | GB | 1103099 | 2/1968 |
| EP | 0375101 | 6/1990 | GB | 1117401 | 6/1968 |
| EP | 0406437 | 1/1991 | GB | 1135242 | 12/1968 |
| EP | 0439410 | 7/1991 | GB | 1147049 | 4/1969 |
| EP | 0440865 | 8/1991 | GB | 1157885 | 7/1969 |
| EP | 0469155 A1 | 2/1992 | GB | 1174659 | 12/1969 |
| EP | 0490705 | 6/1992 | GB | 1236082 | 6/1971 |
| EP | 0503817 | 9/1992 | GB | 1268770 | 3/1972 |
| EP | 0571155 | 11/1993 | GB | 1319257 | 6/1973 |
| EP | 0620570 | 10/1994 | GB | 1322433 | 7/1973 |
| EP | 0620630 | 10/1994 | GB | 1340983 | 12/1973 |
| EP | 0642027 | 3/1995 | GB | 1341050 | 12/1973 |
| EP | 0671632 | 9/1995 | GB | 1365191 | 8/1974 |
| EP | 0676777 | 10/1995 | GB | 1395152 | 5/1975 |
| EP | 0677915 | 10/1995 | GB | 1424982 | 2/1976 |
| EP | 0684679 | 11/1995 | GB | 1426594 | 3/1976 |
| EP | 0684682 | 11/1995 | GB | 1438610 | 6/1976 |
| EP | 0695019 | 1/1996 | GB | 1445284 | 8/1976 |
| EP | 0732787 | 9/1996 | GB | 1479904 | 7/1977 |
| EP | 0738034 | 10/1996 | GB | 1493163 | 11/1977 |
| EP | 0739087 A2 | 10/1996 | GB | 1502938 | 3/1978 |
| EP | 0740315 | 10/1996 | GB | 1525745 | 9/1978 |
| EP | 0749190 A2 | 12/1996 | GB | 2000625 | 1/1979 |
| EP | 0751605 | 1/1997 | GB | 1548633 | 7/1979 |
| EP | 0739087 A3 | 3/1997 | GB | 2046142 | 11/1979 |
| EP | 0749193 A3 | 3/1997 | GB | 2022327 | 12/1979 |
| EP | 0780926 | 6/1997 | GB | 2025150 | 1/1980 |
| EP | 0802542 | 10/1997 | GB | 2034101 | 5/1980 |
| EP | 0913912 A1 | 5/1999 | GB | 1574796 | 9/1980 |
| FR | 805544 | 4/1936 | GB | 2070341 | 9/1981 |
| FR | 841351 | 1/1938 | GB | 2070470 | 9/1981 |
| FR | 847899 | 12/1938 | GB | 2071433 | 9/1981 |
| FR | 916959 | 12/1946 | GB | 2081523 | 2/1982 |
| FR | 1011924 | 4/1949 | GB | 2099635 | 12/1982 |
| FR | 1126975 | 3/1955 | GB | 2105925 | 3/1983 |
| FR | 1238795 | 7/1959 | GB | 2106306 | 4/1983 |
| FR | 2108171 | 5/1972 | GB | 2106721 | 4/1983 |
| FR | 2251938 | 6/1975 | GB | 2136214 | 9/1984 |
| FR | 2305879 | 10/1976 | GB | 2140195 | 11/1984 |
| FR | 2376542 | 7/1978 | GB | 2150153 | 6/1985 |
| FR | 2467502 | 4/1981 | GB | 913386 | 12/1992 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |

| | | | | | |
|---|---|---|---|---|---|
| JP | 6325629 | 5/1993 | WO | WO9745929 | 12/1997 |
| JP | 7057951 | 8/1993 | WO | WO9745930 | 12/1997 |
| JP | 7264789 | 3/1994 | WO | WO9745931 | 12/1997 |
| JP | 8167332 | 12/1994 | WO | WO9745932 | 12/1997 |
| JP | 7161270 | 6/1995 | WO | WO9745933 | 12/1997 |
| JP | 8264039 | 11/1995 | WO | WO9745934 | 12/1997 |
| JP | 9200989 | 1/1996 | WO | WO9745935 | 12/1997 |
| JP | 8036952 | 2/1996 | WO | WO9745936 | 12/1997 |
| JP | 8167360 | 6/1996 | WO | WO9745937 | 12/1997 |
| LU | 67199 | 3/1972 | WO | WO9745938 | 12/1997 |
| SE | 90308 | 9/1937 | WO | WO9745939 | 12/1997 |
| SE | 305899 | 11/1968 | WO | WO9747067 | 12/1997 |
| SE | 255156 | 2/1969 | WO | WO9820595 | 5/1998 |
| SE | 341428 | 12/1971 | WO | WO9820596 | 5/1998 |
| SE | 453236 | 1/1982 | WO | WO9820597 | 5/1998 |
| SE | 457792 | 6/1987 | WO | WO 98/20598 | 5/1998 |
| SE | 502417 | 12/1993 | WO | WO9820600 | 5/1998 |
| SU | 792302 | 1/1971 | WO | WO 98/20602 | 5/1998 |
| SU | 425268 | 9/1974 | WO | WO9821385 | 5/1998 |
| SU | 1019553 | 1/1980 | WO | PCT/FR 98/00468 | 6/1998 |
| SU | 694939 | 1/1982 | WO | WO9827634 | 6/1998 |
| SU | 955369 | 8/1983 | WO | WO9827635 | 6/1998 |
| SU | 1511810 | 5/1987 | WO | WO9827636 | 6/1998 |
| WO | WO8202617 | 8/1982 | WO | WO9829927 | 7/1998 |
| WO | WO8502302 | 5/1985 | WO | WO9829928 | 7/1998 |
| WO | WO9011389 | 10/1990 | WO | WO9829929 | 7/1998 |
| WO | WO9012409 | 10/1990 | WO | WO9829930 | 7/1998 |
| WO | PCT/DE 90/00279 | 11/1990 | WO | WO9829931 | 7/1998 |
| WO | WO9101059 | 1/1991 | WO | WO9829932 | 7/1998 |
| WO | WO9101585 | 2/1991 | WO | WO9833731 | 8/1998 |
| WO | WO9107807 | 3/1991 | WO | WO9833736 | 8/1998 |
| WO | PCT SE 91/00077 | 4/1991 | WO | WO9833737 | 8/1998 |
| WO | WO9109442 | 6/1991 | WO | WO9834238 | 8/1998 |
| WO | WO 91/11841 | 8/1991 | WO | WO 98/34239 | 8/1998 |
| WO | WO8115862 | 10/1991 | WO | WO9834240 | 8/1998 |
| WO | WO 91/15755 | 10/1991 | WO | WO9834241 | 8/1998 |
| WO | WO9201328 | 1/1992 | WO | WO9834242 | 8/1998 |
| WO | WO9203870 | 3/1992 | WO | WO9834243 | 8/1998 |
| WO | WO9321681 | 10/1993 | WO | WO9834244 | 8/1998 |
| WO | WO9406194 | 3/1994 | WO | WO9834245 | 8/1998 |
| WO | WO9518058 | 7/1995 | WO | WO9834246 | 8/1998 |
| WO | WO9522153 | 8/1995 | WO | WO9834247 | 8/1998 |
| WO | WO9524049 | 9/1995 | WO | WO9834248 | 8/1998 |
| WO | WO9622606 | 7/1996 | WO | WO9834249 | 8/1998 |
| WO | WO9622607 | 7/1996 | WO | WO9834250 | 8/1998 |
| WO | PCT/CN 96/00010 | 10/1996 | WO | WO9834309 | 8/1998 |
| WO | WO9630144 | 10/1996 | WO | WO9834312 | 8/1998 |
| WO | WO9710640 | 3/1997 | WO | WO9834315 | 8/1998 |
| WO | WO9711831 | 4/1997 | WO | WO9834321 | 8/1998 |
| WO | WO9716881 | 5/1997 | WO | WO9834322 | 8/1998 |
| WO | WO 97/29494 | 8/1997 | WO | WO9834323 | 8/1998 |
| WO | WO9745288 | 12/1997 | WO | WO9834325 | 8/1998 |
| WO | WO9745847 | 12/1997 | WO | WO9834326 | 8/1998 |
| WO | WO9745848 | 12/1997 | WO | WO9834327 | 8/1998 |
| WO | WO9745906 | 12/1997 | WO | WO9834328 | 8/1998 |
| WO | WO9745907 | 12/1997 | WO | WO9834329 | 8/1998 |
| WO | WO9745912 | 12/1997 | WO | WO9834330 | 8/1998 |
| WO | WO9745914 | 12/1997 | WO | WO9834331 | 8/1998 |
| WO | WO9745915 | 12/1997 | WO | WO 98/40627 | 9/1998 |
| WO | WO9745916 | 12/1997 | WO | WO 98/43336 | 10/1998 |
| WO | WO9745918 | 12/1997 | WO | WO9917309 | 4/1999 |
| WO | WO9745919 | 12/1997 | WO | WO9917311 | 4/1999 |
| WO | WO9745920 | 12/1997 | WO | WO9917312 | 4/1999 |
| WO | WO9745921 | 12/1997 | WO | WO9917313 | 4/1999 |
| WO | WO9745922 | 12/1997 | WO | WO9917314 | 4/1999 |
| WO | WO9745923 | 12/1997 | WO | WO9917315 | 4/1999 |
| WO | WO9745924 | 12/1997 | WO | WO9917316 | 4/1999 |
| WO | WO9745925 | 12/1997 | WO | WO9917422 | 4/1999 |
| WO | WO9745926 | 12/1997 | WO | WO9917424 | 4/1999 |
| WO | WO9745927 | 12/1997 | WO | WO9917425 | 4/1999 |
| WO | WO9745928 | 12/1997 | WO | WO9917426 | 4/1999 |

| | | |
|---|---|---|
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

High Voitage Cables in a New Class of Generators Powerformer: M. Leijon et al: Jun. 14, 1999: pp1–8.

Ohne Tranformator direkt ins Netz: Owman et al. ABB. AB: Feb. 8, 1999: pp48–51.

Submersible Motors and Wet–Rotor Motors for Centrifugal Pumps Submerged in the Fluid Handled: K.. Bienick. KSB: Feb. 25, 1988: pp9–17.

High Voltage Generators: G. Beschastnov et al: 1977: vol. 48. No. 6 pp1–7.

Eine neue Type von Unterwassermotoren: Electrotechnik und Maschinenbam. 49; Aug. 1931; pp2–8.

Problems in design of the 110–5OokV high–voltage generators: Nikiti et al: World Electrotechnical Congress: Jun. 21–22, 1997; Section 1. Paper #18.

Manufacture and Testing of Roebel bars: P. Marti et al; 1960. Pub.85. vol. 8. pp 25–31.

Hydroalternators of 110 to 220 kV Elektrotechn. Obz.. vol. 64, No. 3, pp132–136 Mar. 1975: A. Abramov.

Design Concepts for an Amorphous Metal Distribution Transformer: E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al.; Electrotekhnika, vol. 59. No. 12, pp35–40, 1988.

Zur Entwicklung der Tauchpumpenmotoren: A. Schanz; KSB. pp19–24.

Direct Generation of Alternating current at high voltages: R. Parsons: IEEE Journal, vol. 67 #393. Jan. 15, 1929: pp1065–1080.

Stopfbachslose Umwalzpumpen—ein wichtiges Element im modemen Kraftwerkbau; H. Holtz, KSB 1, pp13–19, 1960.

Zur Geschichte der Brown Boveri–Synchron–Maschinen; Vierzig Jahre Generatorbau; Jan.–Feb 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfocichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable;Ichihara et al; 8/92: pp3–6.

Underground Transmission Systems Reference Book: 1992:pp16–19; pp36–45; pp67–81.

Power System Stability and Control; P. Kundur. 1994: pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Conections, Part 1: Equivalent circuit representation and Steady–State Analysis: R. Schiferl et al: Aug. 1983; pp2685–2693.

Reactive Power Compensation; T. Petersson: 1993; pp 1–23.

Permanent Magnet Machines; K. Binns; 1987: pp 9–1 through 9–26.

Hcchspannungsaniagen for Wechselstrom: 97. Hochspannungsaufgaben an Generatoren und Motoren: Roth et al: 1938: pp452–455.

Hochspannungsanlagen for Wechselstrom; 97. Hochspannungsaufgaben an Generatoren und Motoren: Roth et al: Spring 1959. pp30–33.

Neue Lbsungswege zum Entwurf grosser Turbogeneratoren bis 2GVA. 6OkV; G. Aicholzer: Sep. 1974, pp249–255.

Advanced Turbine–generators—an assessment; A. Appleton. et al; International Conf. Proceedings, Lg HV Elec. Sys. Paris, FR, Aug.–Sep./1976, vol. I. Section 11–02. p.1–9.

Fully slotless turbogenerators: E. Spooner: Proc., IEEE vol. 120 #12. Dec. 1973.

Toroidal winding geometry for high voltage superconducting alternators: J. Kirtley et al: MIT—Elec. Power Sys. Engrg. Lab for IEEE PES:Feb. 1974.

High–Voltage Stator Winding Development: D. Albright et al; Proj. Report EL339. Project 1716, Apr. 1984.

POWERFORMER ™: A giant step in power plant engineering: Owman et al: CIGRE 1998, Paper 11:1.1.

Thin Type DC/DC Converter using a coreless wire transformer; K. Onda et al: Proc. IEEE Power Electronics Spec. Conf.; Jun. 1994, pp330–334.

Development of extruded polymer insulated superconducting cable: Jan. 1992.

Transformer core losses: B. Richardson: Proc. IEEE May 1986. pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* ,1970, pp 6–8.

J&P Transformer Book 11$^{th}$ Edition;A. C. Franklin et al; owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Conneciton of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig Burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp 16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O. Toennesen; Nordic Insulation Symposium, Bergen, 1996, pp 425–432.

MPTC: An economical alternative to universal power flow conrollers;N. Mohan; EPE 1997, Trondheim, pp 3. 1027–3. 1030.

Lexikon der Technik; Luger; Brand 2, Grundlagen der Elektrotechnik und Kerntechnik, 1960, pp 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering, second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan, No. 63* ; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

M. Ichihara and F. Fukasawa, "An EHV Bulk Power Transmission Line Made with Low Loss XLPE Cable," Aug. 1992, *Hitachi Cable Review*, No. 11, pp. 3–6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw–Hill, Inc.

R. F. Schiferl and C. M. Ong, "Six Phase Synchronous Machine with AC and DC Stator Connections. Part II: Harmonic Studies and a Proposed Uninterruptible Power Supply Scheme", *IEEE Transactions on Power Apparatus and Systems*, vol. PAS–102, No. 8, Aug. 1983, pp. 2694–2701.

R. F. Schiferl and C. M. Ong, "Six Phase Synchronous Machine with AC and DC Stator Connections, Part I: Equivalent Circuit Representation and Steady–State Analysis", *IEEE Transactions on Power Apparatus and Systems*, vol. PAS–102, No. 8, Aug. 1983, pp. 2685–2693.

T. Petersson, *Reactive Power Compensation*, Abb Power Systems, AB, Dec. 1993.

"Different types of Permanent Magnet Rotors", a summary by ABB Corporate Research, Nov. 1997.

K. Binns, Permanent Magnet Machines, *Handbook of Electric Machines*, Chapter 9, McGraw Hill, 1987, pp. 9–1–9–25.

* cited by examiner

ROTATING ASYNCHRONOUS CONVERTER AND A GENERATOR DEVICE

TECHNICAL FIELD OF THE INVENTION

The present invention relates to a rotating asynchronous converter.

The present invention also relates to a generator device.

BACKGROUND OF THE INVENTION

In a number of situations exchange of power must be performed between AC networks with different or at least not synchronous frequencies. The most frequent cases are the following:

1. Connection of not synchronous three phase networks with equal rating frequencies, e.g. between eastern and western Europe.
2. Connection of three phase networks with different frequencies, most usually 50 Hz/60 Hz (e.g. Japan, Latin America).
3. Connection of a three phase network and a low frequency, one/two phase network for railway supply, in Europe 50 Hz/16.2/3 Hz, in USA 60 Hz/25 Hz.
4. The use of rotating asynchronous converters as a series compensation in long distance AC transmission.

Today, the connection is performed with the aid of power electronics and DC intermediate link. In the above mentioned cases 2 and 3 the connection can further be performed with the aid of matrix converters. In case of synchronous, but different frequencies in the above mentioned cases 2 and 3 the connection can further be performed with the aid of rotating converters comprising mechanically connected synchronous machines.

In the article, "Investigation and use of asynchronized machines in power systems", Electric Technology USSR, No. 4, pp. 90–99, 1985, by N. I. Blotskii, there is disclosed an asynchronized machine used for interconnection of power systems, or their parts, which have different rated frequencies, or the same rated frequencies, but differing in the degree of accuracy with which it must be maintained. The structure of the asynchronized machine is disclosed in FIG. 1. The asynchronized machine includes an electric machine 1 which is a machine with a conventional three-phase stator and either a non-salient-pole symmetrical rotor or a salient-pole or non-salient-pole electrically asymmetrical rotor, the phase leads being connected to slip rings; an exciter 2 which is a cycloconverter or reversing controlled rectifier, the cycloconverter supply 3 or 4, a regulator 5 forming the control law required for the rotor ring voltages and the main machine rotor angle and speed 6, voltage 7 and current 9 sensors of the stator and rotor.

In the article, "Performance Characteristics of a Wide Range Induction type Frequency Converter", IEEMA Journal, Vol. 125, No. 9, pp. 21–34, Sep. 1995, by G. A. Ghoneem, there is disclosed an induction-type frequency converter as a variable frequency source for speed control drives of induction motors. In FIG. 2 there is disclosed a schematic diagram of the induction-type frequency converter. The induction-type frequency converter consists of two mechanically and electrically coupled wound rotor induction machines A, B. The stator windings of one of them (A) are connected to 3-phase supply at line frequency (Vi, Fi), while the stator windings of the other machine (B) represent the variable frequency output (Vo, Fo). The rotor windings 10, 12 of the two machines are connected together with special arrangement. The converter is driven by a variable speed primemover 14, a DC motor can be used.

Static converters have drawbacks such as relatively low efficiency (ca 95%) owing to the losses in the semiconductors, harmonics which have to be compensated with the aid of filters. The use of DC intermediate links leads to the use of special converter transformers with very complex design. The fillers are leading to a great need of space for the total assembly. Conventional rotating converters are not designed for high voltages, so a transformer is needed at each side for the connection to the AC network. The efficiency then becomes comparable to or even lower than the efficiency of a static converter.

SUMMARY OF THE INVENTION

The object of the invention is to solve the above mentioned problems and to provide a rotating asynchronous converter for connection of AC networks with equal or different frequencies. This object is achieved by providing a rotating asynchronous converter.

Accordingly, the converter comprises a first stator connected to a first AC network with a first frequency $f_1$, and a second stator connected to a second AC network with a second frequency $f_2$. The converter also comprises a rotor means which rotates in dependence of the first and second frequencies $f_1$, $f_2$. At least one of the stators each comprise at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the converter, it comprises a first stator connected to a first AC network with a first frequency $f_1$, and a second stator connected to a second AC network with a second frequency $f_2$. The converter also comprises a rotor means which rotates in dependence of said fist and second frequencies $f_1$, $f_2$. The stators each comprise at least one winding, wherein each winding comprises a cable comprising at least one current-carrying conductor, each conductor comprises a number of strands, around said conductor is arranged an inner semiconducting layer, around said inner semiconducting layer is arranged an insulating layer of solid insulation, and around said insulating layer is arranged an outer semi-conductor layer.

According to another embodiment of the converter, it comprises a first stator connected to a first AC network with a first frequency $f_1$, and a second stator connected to a second AC network with a second frequency $f_2$. The converter also comprises a rotor means which rotates in dependence of said first and second frequencies $f_1$, $f_2$. The stators each comprises at least one winding, wherein each winding comprises at least one correct-carrying conductor. Each winding also comprises an insulation system, which in respect of its thermal and electrical properties permits a voltage level in said rotating asynchronous converter exceeding 36 kV.

A very important advantage of the present invention is that it is possible to achieve a connection of two not synchronous networks without the further use of transformers or any other equipment. Another advantage is the high efficiency, which is expected to be 99%.

By designing the insulation system, which suitably is solid, so that it in thermal and electrical view is dimensioned for voltages exceeding 36 kV, the system can be connected to high voltage power networks without the use of intermediate step-down-transformers, whereby is achieved the above referenced advantages. Such a system is preferably, but not necessarily, designed in such a way that it comprises the features of the rotating asynchronous converter.

Another object of the invention is to solve the above mentioned problems and to provide a generator device with variable rotational speed. This object is achieved by providing a generator device.

Accordingly, the generator device comprises a stator connected to an AC network with a frequency $f_2$, a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the generator device, it comprises a stator connected to an AC network with a frequency $f_2$, and a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises a cable comprising at least one current-carrying conductor, each conductor comprises a number of strands, around said conductor is arranged an inner semiconducting layer, around said inner semiconducting layer is arranged an insulating layer of solid insulation, and around said insulating layer is arranged an outer semiconducting layer.

The above mentioned and other preferable embodiments of the present invention are specified in the dependent claims.

In a certain aspect of the present invention it relates to the use of the invented asynchronous converter in specific applications such as those specified in claims 38–41, in which applications the advantages of the invented device are particularly prominent.

Embodiments of the invention will now be described with a reference to the accompanying drawings, in which:

DETAILED DESCRIPTION OF EMBODIMENTS

Figure 1:
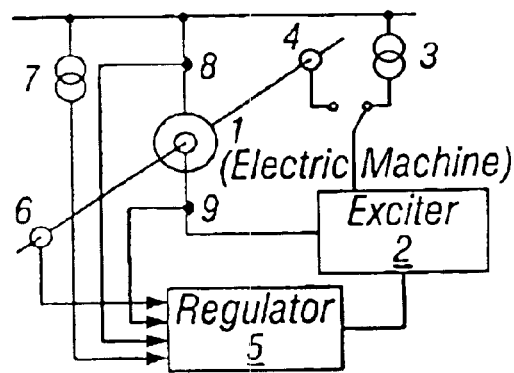
FIG. 1 shows a schematic diagram of an asynchronized machine used for interconnection of power system according to the state of the art.
Figure 2:
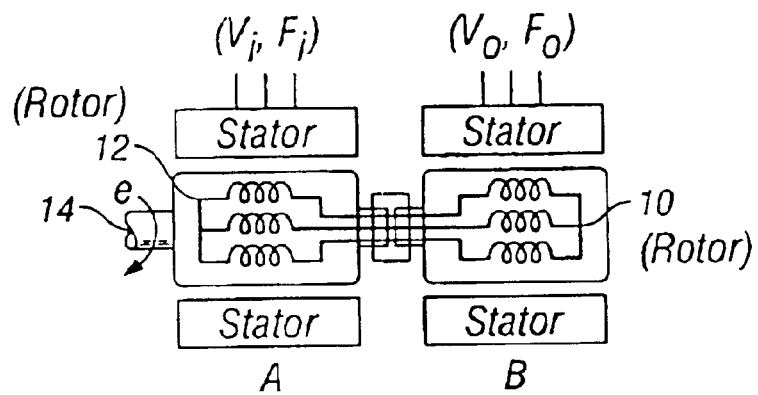
FIG. 2 shows a schematic diagram of an induction-type frequency converter as a variable frequency source according to the state of the art.
Figure 3:
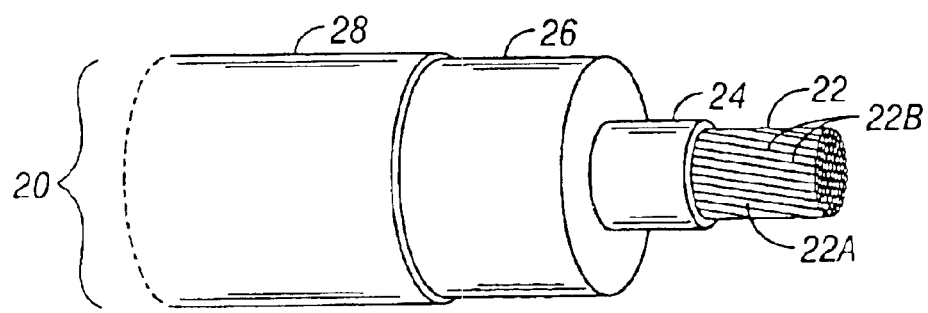
FIG. 3 shows the parts included in the current modified standard cable.

A preferred embodiment of the improved cable is shown in FIG. 3. The cable 20 is described in the figure as comprising a current-carrying conductor 22 which comprises both transposed non-insulated 22A and insulated 22B strands. There is an extruded inner semiconducting casing 24 which, in turn, is surrounded by an extruded insulation layer 26. This layer is surrounded by an external semiconducting layer 28. The cable used as a winding in the preferred embodiment has no metal shield and no external sheath.

Preferably, at least two of these layers, and most preferably all of them, has equal thermal expansion coefficients. Hereby is achieved the crucial advantage that in case of thermal motion in the winding, one avoids defects, cracks or the like.

Figure 4:
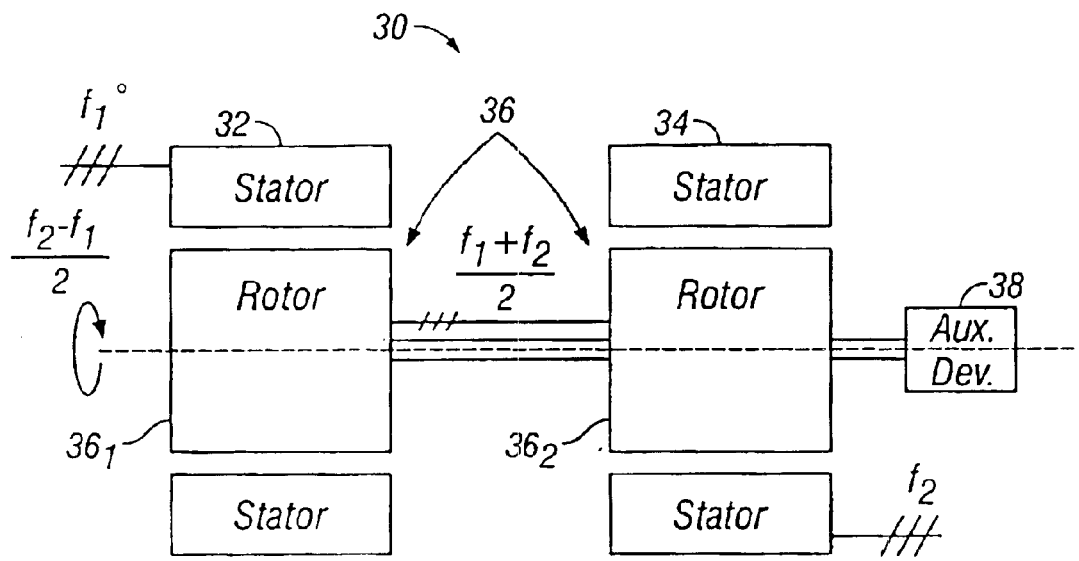
FIG. 4 shows a first embodiment of a rotating asynchronous converter according to the present invention.

FIG. 4 shows a first embodiment of a rotating asynchronous converter 30 according to the present invention. The rotating asynchronous converter 30 is used for connection of AC networks with equal or different frequencies. The converter 30 comprises a first stator 32 connected to a first AC network (not disclosed) with a first frequency $f_1$, and a second stator 34 connected to a second AC network (not disclosed) with a second frequency $f_2$. In the disclosed embodiment the stators 32, 34 are three phase stators 32, 34 comprising three windings each, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. The windings can also be formed of a cable of the type disclosed in FIG. 3. The converter 30 also comprises a rotor means 36 which rotates in dependence of the first and second frequencies $f_1$, $f_2$. In the disclosed embodiment the rotor means 36 comprises two electrically and mechanically connected three phase rotors $36_1$, $36_2$, which are concentrically arranged in respect of said stators 32, 34. The converter 30 also comprises an auxiliary device 38 connected to said rotors $36_1$, $36_2$ for starting up of the rotors $36_1$, $36_2$ to a suitable rotation speed before connection of said converter 30 to said AC networks. Each rotor $36_1$, $36_2$ comprises a low voltage winding (not disclosed). When the first stator 32 is connected to a three phase AC network with the frequency $f_1$ and the second stator 34 is connected to a three phase AC network with the frequency $f_2$, the rotors $36_1$, $36_2$ will rotate with the frequency $(f_1-f_2)/2$ and the stator current has the frequency $(f_1+f_2)/2$. The efficiency with such a converter will be very high (~99%) for small frequency differences due to the fact that all power is transmitted as in a transformer. Assuming $f_1<f_2$, a proportion $$\frac{f_1 - f_2}{f_2}$$

of the power is transmitted mechanically and the remainder $$\frac{f_1}{f_2}$$

of the power is transmitted by transformer action. Mechanical power is only consumed to maintain the rotation.

Figure 5:
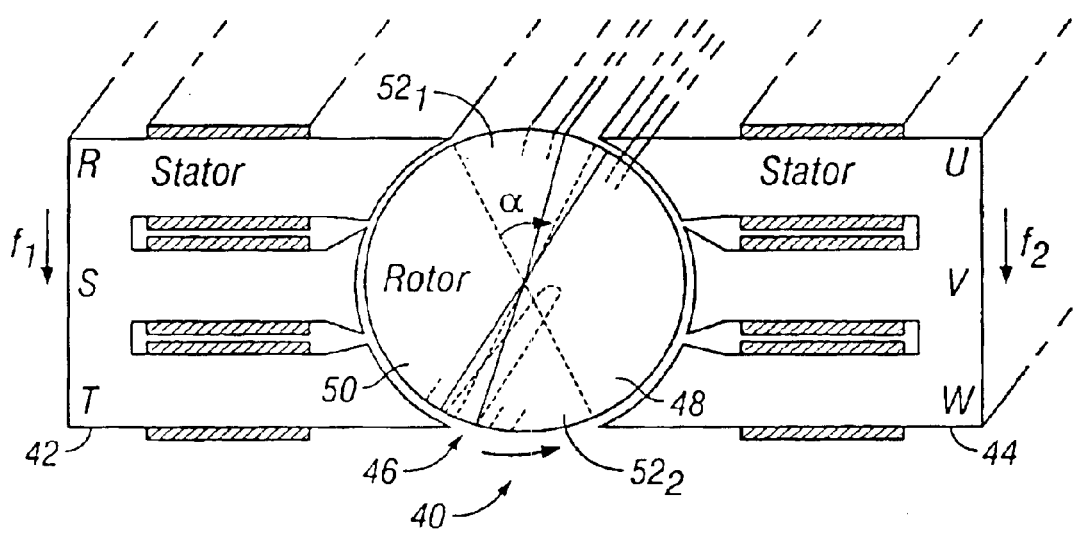
FIG. 5 shows a second embodiment of the rotating asynchronous converter according to the present invention.

In FIG. 5 there is disclosed a second embodiment of the rotating asynchronous converter 40 according to the present invention. The rotating asynchronous converter 40 is also used for connection of AC networks with equal or different frequencies. The converter 40 comprises a first stator 42 connected to a first AC network (not disclosed) with a first frequency $f_1$, and a second stator 44 connected to a second AC network (not disclosed) with a second frequency $f_2$. In the disclosed embodiment the stators 42, 44 are three phase stators 42, 44 comprising three windings each, wherein each winding can be of the type described in connection to FIG. 4. The converter 40 also comprises a rotor means 46 which rotates in dependence of the first and second frequencies $f_1$, $f_2$. In the disclosed embodiment the rotor means 46 comprises only one rotor 46 concentrically arranged in respect of said stators 42, 44. Said rotor 46 also comprises a first loop of wire 48 and a second loop of wire 50, wherein said loops of wire 48, 50 are connected to each other and are arranged opposite each other on said rotor 46. The loops of wire 48, 50 are also separated by two sectors 52$_1$, 52$_2$, wherein each sector 52$_1$, 52$_2$ has an angular width of $\alpha$. The converter 40 also comprises an auxiliary device (not disclosed) connected to said rotor 46 for starting up of the rotor 46 to a suitable rotational speed before connection of said converter 40 to said AC networks. To compensate for the frequency difference $\Delta f$, the rotor 46 only needs to rotate with the frequency $$f_R = \frac{\pi - \alpha}{\pi} \cdot \frac{\Delta f}{4},$$

wherein $\Delta f = |f_1 - f_2|$. For $\alpha = \pi/4$ this means $$f_R = \frac{3\Delta f}{16},$$

a very low rotational frequency. The main advantages with this embodiment are the low rotational frequency and the use of only one rotor.

Figure 6:
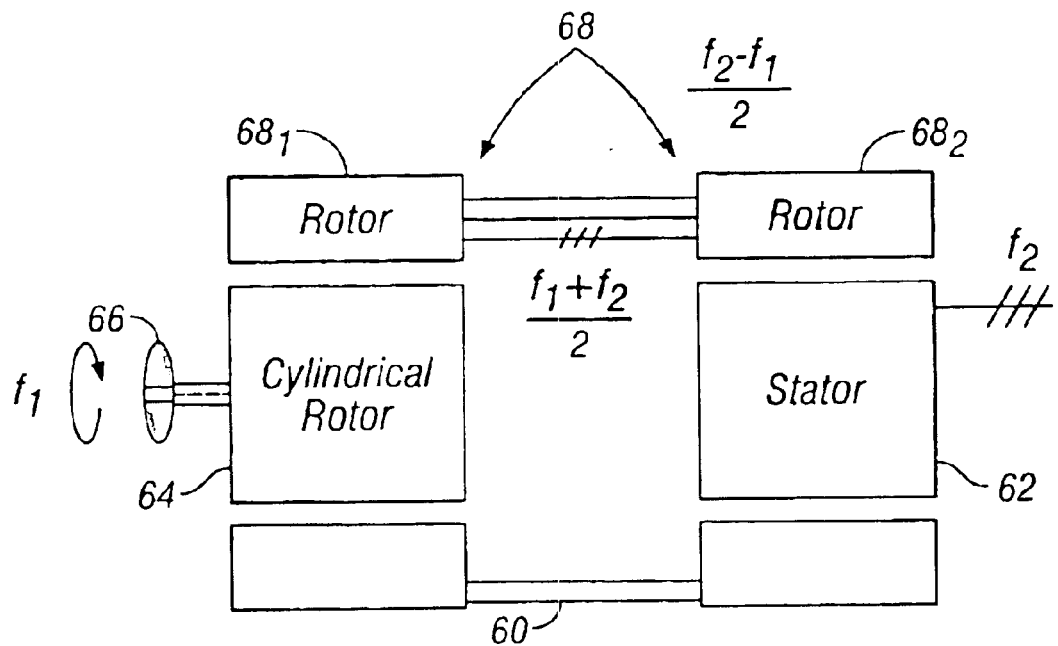
FIG. 6 shows a first embodiment of a generator device according to the present invention.

In FIG. 6 there is disclosed a first embodiment of a generator device 60 with variable rotational speed according to the present invention. The generator device 60 comprises a stator 62 connected to an AC network (not disclosed) with a frequency $f_2$ and a first cylindrical rotor 64 connected to a turbine 66, which rotates with a frequency $f_1$. The generator device 60 comprises also a rotor means 68 which rotates in dependence of the frequencies $f_1$, $f_2$. The stator 62 and said first cylindrical rotor 64 each comprises at least one winding (not disclosed). Each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. Each winding can in another embodiment also comprise a cable of the type disclosed in FIG. 3. The rotor means 68 comprises two electrically and mechanically connected rotors 68$_1$, 68$_2$, which rotors 68$_1$, 68$_2$ are hollow and arranged concentrically around said stator 62 and said cylindrical rotor 64. The stator 62 in the disclosed embodiment has a cylindrical shape. The rotors 68$_1$, 68$_2$ each comprises a low voltage winding (not disclosed) and they are rotating with the frequency $(f_1-f_2)/2$ when said generator device is in operation. The frequency of the rotor current will be $(f_1+f_2)/2$ when the generator device 60 is in operation. This generator device 60 is now disconnected from the power frequency and can be operated with the frequency as an optimizeable parameter. This generator device 60 will also give a better efficiency and power matching than a conventional generator.

Figure 7:
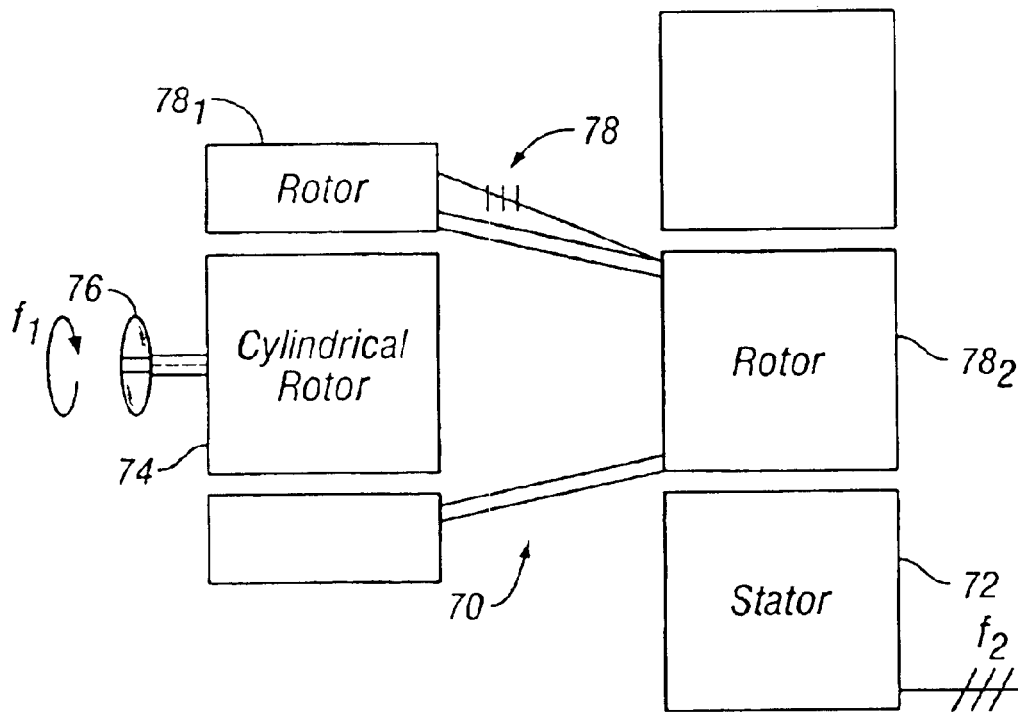
FIG. 7 shows a second embodiment of the generator device according to the present invention.

In FIG. 7 there is disclosed a second embodiment of the generator device 70 according to the present invention. The generator device 70 comprises a stator 72 connected to an AC network (not disclosed) with a frequency $f_2$ and a first cylindrical rotor 74 connected to a turbine 76, which rotates with a frequency $f_1$. The generator device 70 also comprises a rotor means 78 which rotates in dependence of the frequencies $f_1$, $f_2$. The stator 72 and said first cylindrical rotor 74 each comprises at least one winding (not disclosed). The winding can be of the types which were mentioned in the description in connection to FIG. 6. The rotor means 78 comprises a first rotor 78$_1$ and a second rotor 78$_2$, which rotors 78$_1$, 78$_2$ are electrically and mechanically connected to each other. The first rotor 78$_1$ is hollow and arranged concentrically around said first cylindrical rotor 74 and said second rotor 78$_2$ is cylindrical and surrounded by the stator 72. The first and second rotors 78$_1$, 78$_2$ of said rotor means 78 each comprises a low voltage winding and said rotors 78$_1$, 78$_2$ are rotating with the frequency $(f_1-f_2)/2$ when said generator device 70 is in operation. The stator 72 is hollow and arranged around said second rotor 78$_2$. This generator device 70 works in the same way and has the same advantages as the generator device 60 disclosed in FIG. 6.

The disclosed embodiments only show connection of three phase networks, but the invention is also applicable for connection of a three phase network, wherein one stator has a one/two phase application. The invention can also be used for connection of a three phase network and a one/two phase network, wherein one stator having a three phase application is connected via a Scott-connection or another symmetrical connection to a one/two phase network. The invention is also applicable to more than two stators and rotor parts to connect more than two AC networks. The only condition is that only two not synchronous networks are connected.

The invention is not limited to the embodiments described in the foregoing. It will be obvious that many different modifications are possible within the scope of the following claims.

What is claimed is:

1. A rotating asynchronous high voltage converter for connection of AC networks with equal or different frequencies, wherein the converter comprises a first stator connected to a first AC network with a first frequency $f_1$, and a second stator connected to a second AC network with a second frequency $f_2$, wherein the converter comprises a rotor which rotates in dependence of the first and second frequencies $f_1$, $f_2$, and wherein at least one of said stators includes at least one winding forming at least one uninterrupted turn, said winding including a current-carrying conductor a plurality of insulated conductive elements and at least one uninsulated conductive element, and a magnetically permeable, electric field confining insulating covering surrounding the conductor, including an inner layer having semiconducting properties being in electrical contact with the conductor, an insulating layer surrounding the inner layer being in intimate contact therewith and an outer layer having semiconducting properties surrounding the insulating layer and being in intimate contact therewith, wherein each layer forms a substantially equipotential surface.

2. The rotating asynchronous converter according to claim 1, wherein at least one of said semiconducting layers has substantially equal thermal expansion coefficient as said solid insulation.

3. The rotating asynchronous converter according to claim 2, wherein the potential of the inner one of said layers is substantially equal to the potential of the conductor.

4. The rotating asynchronous converter according to claim 1, wherein the outer layer is arranged to form substantially an equipotential surface surrounding said conductor.

5. The rotating asynchronous converter according to claim 4, wherein said outer layer is connected to a specific potential.

6. The rotating asynchronous converter according to claim 5, wherein said specific potential is ground potential.

7. The rotating asynchronous converter according to claim 1, wherein said inner and outer layers have substantially equal thermal expansion coefficients.

8. The rotating asynchronous converter according to claim 1, wherein each of said inner and outer layers is fixedly connected to the adjacent layer of solid insulation along substantially the whole of a connecting surface therebetween.

9. The rotating asynchronous converter according to claim 1, wherein the winding comprises a cable having a diameter comprised in the approximate interval 20–250 mm and a conductor area comprised in the approximate interval 80–3000 mm$^2$.

10. The rotating asynchronous converter according to claim 1, wherein said rotor comprises two electrically and mechanically connected rotors, which are concentrically arranged in respect of said stators.

11. The rotating asynchronous converter according to claim 10, wherein said converter further comprises an auxiliary device connected to said rotors for starting up the rotors to a suitable rotation speed before connection of said converter.

12. The rotating asynchronous converter according to claim 11, wherein each of said rotors comprises a low voltage winding, and wherein said rotors are rotatable with the frequency $(f_1-f_2)/2$ and the stator has a current with a frequency $(f_1+f_2)/2$ when said converter is in operation.

13. The rotating asynchronous converter according to claim 1 wherein said rotor comprises a single rotor concentrically arranged in respect of said stators.

14. The rotating asynchronous converter according to claim 13, wherein said rotor comprises a first loop of cable and a second loop of cable, wherein said loops of cable are connected to each other and are arranged opposite each other on said rotor and separated by two sectors, wherein each sector has an angular width of α.

15. The rotating asynchronous converter according to claim 14, wherein said converter further comprises an auxiliary device connected to said rotor for starting up the rotor to a suitable rotational speed before connection of said converter, and said rotor is rotatable with the frequency $$f_R = \frac{\pi - \alpha}{\pi} \cdot \frac{\Delta f}{4},$$

wherein $\Delta f = |f_1-f_2|$.

16. The use of a rotating asynchronous converter in accordance with claim 1 for connection of non-synchronous three phase networks with equal rating frequencies.

17. The use of a rotating asynchronous converter in accordance with claim 1 for connection of three phase networks with different frequencies.

18. The use of a rotating asynchronous converter in accordance with claim 1 as a series compensation in long distance AC transmission.

19. The use of a rotating asynchronous converter in accordance with claim 1 for reactive power compensation.

20. A rotating asynchronous converter for connection of AC networks with equal or different frequencies, wherein the converter comprises a first stator for connection to a first AC network with a first frequency $f_1$, and a second stator for connection to a second AC network with a second frequency $f_2$, rotor means rotatable in dependence of the first and second frequencies $f_1$, $f_2$, and each stator includes at least one winding forming at least one uninterrupted turn, said winding comprising at least one current-carrying conductor a plurality of insulated conductive elements and at least one uninsulated conductive element, and a magnetically permeable, electric field confining insulation system surrounding the conductor, including an inner layer having semiconducting properties being in electrical contact with the conductor, an insulating layer surrounding the inner layer being in intimate contact therewith, and an outer layer having semiconducting properties surrounding the insulating layer and being in intimate contact therewith, wherein each layer forms a substantially equipotential surface, which permits a voltage level in said rotating asynchronous converter exceeding 36 kV.

21. A generator device operable with variable rotational speed, wherein the generator device comprises a stator for connection to an AC network with a frequency $f_2$, a first cylindrical rotor for connection to a turbine, rotatable at a frequency $f_1$, wherein said generator device comprises rotor means being rotatable in dependence of the frequencies $f_1$, $f_2$, and said stator and said first cylindrical rotor each includes at least one winding forming at least one uninterrupted turn, said winding comprising at least one current-carrying conductor a plurality of insulated conductive elements and at least one uninsulated conductive element, and a magnetically permeable, electric field confining insulation system, including an inner layer having semiconducting properties being in electrical contact with the conductor, an insulating layer surrounding the inner layer being in intimate contact therewith and an outer layer having semiconducting properties surrounding the insulating layer and being in intimate contact therewith, wherein each layer forms a substantially equipotential surface surrounding the conductor.

22. The generator device according to claim 21, wherein at least one of said semiconducting layers has substantially equal thermal expansion coefficient as said solid insulation.

23. The generator device according to claim 22, wherein the inner layer has a potential substantially equal to a potential of the conductor.

24. The generator device according to claim 22, wherein the outer one of said layers is arranged to form substantially an equipotential surface surrounding said conductor.

25. The generator device according to claim 24, wherein said outer layer is connected to a specific potential.

26. The generator device according to claim 25, wherein said specific potential is ground potential.

27. The generator device according to claim 21, wherein at least two of said layers have substantially equal thermal expansion coefficients.

28. The generator device according to claim 21, wherein each of said two layers and said solid insulation is connected to adjacent layer or solid insulation along substantially the whole connecting surface.

29. A generator device with variable rotational speed comprising a stator for connection to an AC network with a frequency f2, a first cylindrical rotor for connection to a turbine, being rotatable with a frequency $f_1$, wherein said generator device comprises rotor means including two electrically and mechanically connected hollow rotors arranged concentrically around said stator and said cylindrical rotor, being rotatable in dependence of the frequencies $f_1$, $f_2$, and said stator and said first cylindrical rotor each comprises at least one winding, forming at least one uninterrupted turn, wherein each winding comprises a cable including at least one current-carrying conductor, each conductor comprises a number of conductive elements, an inner semiconducting layer surrounding the conductor and being in electrical contact therewith, an insulating layer of solid insulation surrounding the inner layer and being in intimate contact therewith, and an outermost layer having semiconducting properties surrounding the insulating layer and being in intimate contact therewith, wherein each inner and outermost layer forms a substantially equipotential surface surrounding the conductor.

30. The generator device according to claim 29, wherein the cable has a diameter of about 20–250 mm and a conductor area is about 80–3000 mm$^2$.

31. The generator device according to claim 29, wherein said rotor means comprises a plurality of insulated conductive elements and at least one uninsulated conductive element.

32. The generator device according to claim 29, wherein each of said rotors comprises a low voltage winding, and said rotor is rotatable at a frequency $(f_1-f_2)/2$ when said generator device is in operation.

33. The generator device according to claim 32, wherein said stator has a cylindrical shape.

34. The generator device according to claim 29, wherein said two rotors comprise a first rotor and a second rotor, wherein-said first rotor is arranged concentrically around said first cylindrical rotor, and said second rotor is cylindrical.

35. The generator device according to claim 29, wherein said first and second rotors of said rotor means each comprises a low voltage winding, and wherein said first and second rotors are rotatable at a frequency $(f_1-f_2)/2$ when said generator device is in operation.

36. The generator device according to claim 35, wherein said stator is hollow and arranged around said second rotor.

37. A rotating asynchronous converter employing a high voltage electric machine comprising a stator, a rotor and a winding comprising a cable including at least one current-carrying conductor and a magnetically permeable, electric field confining cover surrounding the conductor and being in electrical contact therewith, said conductor including a plurality of insulated conductive strands and at least one uninsulated conductive strand in contact with the cover, said cable forming at least one uninterrupted turn in the corresponding winding of said machine, and wherein said cover includes an inner semiconducting layer surrounding the conductor; and being in electrical contact therewith, an outermost layer of solid insulation surrounding the inner layer and being in intimate contact therewith, and an outermost layer having semiconducting properties surrounding the insulating layer and being in intimate contact therewith, wherein each inner and outermost layer forms a substantially equipotential surface surrounding the conductor.

38. The converter of claim 37, wherein the inner layer and outermost layer each have a conductivity sufficient to establish an equipotential surface around the conductor.

39. The converter of claim 37, wherein the inner layer and outermost layer have semiconducting properties.

40. The converter of claim 37, wherein the inner layer, insulating layer and outermost layer are substantially void free.

41. The converter of claim 37, wherein the machine is operable at 100% overload for two hours.

42. The converter of claim 37, wherein the winding is operable free of sensible end winding loss.

43. The converter of claim 37, wherein the winding is operable free of partial discharge and field control.

44. The converter of claim 37, wherein the winding comprises multiple uninterrupted turns.

45. The converter of claim 37, wherein the cable is flexible.

46. A rotating asynchronous converter for connection of AC networks with equal or different frequencies, wherein the converter comprises a first stator connected to a first AC network with a first frequency $f_1$, and a second stator connected to a second AC network with a second frequency $f_2$, wherein the converter further comprises rotor means which rotates in dependence of said first and second frequencies $f_1$, $f_2$, said stators each comprise at least one winding, wherein each winding comprise a cable including at least one current-carrying conductor, and an electric field confining, solid insulation covering surrounding the conductor, said conductor including at least one of a plurality of insulated conductive elements and at least one uninsulated conductive element in contact with the covering, said cable comprising an inner semiconducting layer surrounding the conductor, and being in electrical contact therewith an insulating layer of solid insulation surrounding the inner layer and being in intimate contact therewith, and an outermost layer having semiconducting properties surrounding the insulating layer and being in intimate contact therewith, wherein each inner and outermost layer forms a substantially equipotential surface surrounding the conductor.

* * * * *